(12) United States Patent
Klöpzig

(10) Patent No.: US 8,978,595 B2
(45) Date of Patent: Mar. 17, 2015

(54) PISTON ENGINE HAVING MAGNETIC PISTON BEARING

(75) Inventor: Markus Klöpzig, Ebermannstadt (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/394,254

(22) PCT Filed: Aug. 26, 2010

(86) PCT No.: PCT/EP2010/062438
§ 371 (c)(1),
(2), (4) Date: Mar. 5, 2012

(87) PCT Pub. No.: WO2011/026774
PCT Pub. Date: Mar. 10, 2011

(65) Prior Publication Data
US 2012/0160190 A1     Jun. 28, 2012

(30) Foreign Application Priority Data
Sep. 3, 2009   (DE) .......................... 10 2009 040 051

(51) Int. Cl.
*F02B 63/00*     (2006.01)
*F02B 71/00*     (2006.01)
(Continued)

(52) U.S. Cl.
CPC ............. *F02B 71/00* (2013.01); *F16C 32/0472* (2013.01); *F16C 32/048* (2013.01); *F02B 63/04* (2013.01); *F02B 77/13* (2013.01); *F02B 63/044* (2013.01); *F02B 75/16* (2013.01)
USPC .......................................................... 123/2

(58) Field of Classification Search
CPC .. F02B 63/04; F02B 2063/045; F02B 63/044; F02B 77/13; F02B 75/16
USPC ............................................................ 123/2
See application file for complete search history.

(56) References Cited

U.S. PATENT DOCUMENTS 3,095,901 A * 7/1963 Larson et al. ................. 137/522
4,339,109 A * 7/1982 Kawata et al. ........... 251/129.08
(Continued)

FOREIGN PATENT DOCUMENTS

DE  10 2009 040 051.6   9/2009
EP  0 053 873            6/1982
(Continued)

OTHER PUBLICATIONS

BioAge Group LLC, DLR team develops demonstrator of free-piston linear generator as range extender for EVs; technology transfer to Universal Motor Corp., Feb. 20, 2013, Green Car Congress, Aug. 23, 2013, p. 1.*

(Continued)

*Primary Examiner* — Lindsay Low
*Assistant Examiner* — Charles Brauch
(74) *Attorney, Agent, or Firm* — Staas & Halsey LLP

(57) ABSTRACT

A piston engine has a housing and a piston. The piston is magnetically and movably disposed in the housing. A device for magnetically supporting the piston is fixedly mounted relative to the housing. A linear machine in conjunction with the magnetic bearing of the piston can prevent friction and thus result in a machine for converting mechanical into electric energy without having to lubricate and with reduced mechanical effort.

19 Claims, 2 Drawing Sheets

(51) Int. Cl.
*F16C 32/04* (2006.01)
*F02B 63/04* (2006.01)
*F02B 77/13* (2006.01)
*F02B 75/16* (2006.01)

(56) References Cited

U.S. PATENT DOCUMENTS

| | | | |
|---|---|---|---|
| 4,387,935 A | 6/1983 | Studer | |
| 4,473,259 A | 9/1984 | Goldowsky | |
| 4,703,227 A | 10/1987 | Takeda et al. | |
| 4,889,039 A | 12/1989 | Miller | |
| 5,216,308 A * | 6/1993 | Meeks | 310/90.5 |
| 5,250,865 A * | 10/1993 | Meeks | 310/90.5 |
| 5,287,031 A | 2/1994 | Akiba et al. | |
| 5,315,197 A * | 5/1994 | Meeks et al. | 310/90.5 |
| 5,329,768 A * | 7/1994 | Moscrip | 60/518 |
| 5,514,924 A * | 5/1996 | McMullen et al. | 310/90.5 |
| 6,035,637 A * | 3/2000 | Beale et al. | 60/595 |
| 6,886,801 B2 * | 5/2005 | Hallback et al. | 251/129.15 |
| 2002/0059956 A1 * | 5/2002 | Bauer et al. | 137/554 |
| 2005/0072148 A1 * | 4/2005 | Francois et al. | 60/516 |
| 2007/0210139 A1 * | 9/2007 | Nakatsuka et al. | 228/101 |
| 2007/0212237 A1 | 9/2007 | Zhao | |
| 2010/0282187 A1 * | 11/2010 | Gilpatrick | 123/2 |

FOREIGN PATENT DOCUMENTS

| | | |
|---|---|---|
| EP | 0 098 002 | 1/1984 |
| EP | 0 534 613 | 3/1993 |
| EP | PCT/EP2010/062438 | 8/2010 |
| JP | 60-39753 | 3/1985 |
| JP | 60-73106 | 4/1985 |
| JP | 60-217318 | 10/1985 |
| RU | 2141570 C1 | 11/1999 |
| RU | 2156870 C2 | 9/2000 |
| RU | 2174734 C1 | 10/2001 |
| WO | 95/33921 | 12/1995 |
| WO | 00/55482 | 9/2000 |
| WO | 02/40843 | 5/2002 |
| WO | WO 2009/045521 A1 | 4/2009 |

OTHER PUBLICATIONS

International Search Report for PCT/EP2010/062438, mailed Dec. 6, 2010.
German Office Action for Priority German Patent Application No. 10 2009 040 051.6, issued on Jun. 2, 2010.
Canadian Office Action for related Canadian Patent Application No. 2,722,845, issued on Apr. 15, 2013.
Japanese Office Action mailed Jul. 30, 2013 in corresponding Japanese Application No. 2012-527284.
Russian Office Action dated Jul. 5, 2013 in corresponding Russian Application No. 2012112815.

* cited by examiner

PISTON ENGINE HAVING MAGNETIC PISTON BEARING

CROSS REFERENCE TO RELATED APPLICATIONS

This application is based on and hereby claims priority to International Application No. PCT/EP2010/062438 filed on Aug. 26, 2010 and German Application No. 10 2009 040 051.6 filed on Sep. 3, 2009, the contents of which are hereby incorporated by reference.

BACKGROUND

The present invention relates to a piston engine having at least one first piston and at least one first housing.

Heat engines are used for conversion of chemical energy into mechanical energy, from thermal energy into mechanical energy and from mechanical energy into thermal energy. Internal combustion engines as a heat engine convert chemical energy into mechanical energy, Stirling engines as a heat engine convert thermal energy into mechanical energy and heat pumps as a heat engine convert mechanical energy into thermal energy. One of the most frequently used heat engines is the piston engine, in which mechanical energy is transmitted from a piston to a shaft by a connecting rod.

An alternative construction is provided by the free-piston engine. A free-piston engine is a piston engine without a connecting rod. Free-piston engines are used for example as a pump for a hydraulic system or in conjunction with a linear generator for the direct generation of electrical energy.

Regardless of whether a heat engine is designed as a conventional piston engine or as a free-piston engine, during operation friction usually occurs between the piston and the cylinder, which leads to wear. In time, the wear results in a limited function or leads to destruction of the heat engine. A conventional solution of the problem of friction or wear is effected by lubrication of the engine. Lubrication reduces the mechanical friction between the piston and the cylinder, but does not completely remedy the problem of wear. Particularly transverse forces which can act upon the piston, for example depending upon the position of a connecting rod, represent a possible cause for the wear of the piston-cylinder system, which is not remedied by lubrication. Lubrication via an oil pump furthermore involves problems when the engine is being started if the oil pump is operated via the crankshaft, and at low rotational speeds of the heat engine, during which only a low oil pressure is created.

Wear leads to a significant reduction of the service life of engines. In motor vehicles, for example, wear can lead to a reduction of the service life by 10,000 operating hours and in diesel engines of construction machines wear can lead to a reduction of the service life by up to 15,000 operating hours.

The use of lubrication also leads to problems. In internal combustion engines, some of the lubricating oil is always burnt in addition and so leads inter alia to an increased loading of the environment. Lubricating oils are destroyed as a result of contaminants and as a result of the forces exerted upon them, which is why in the case of lubricated engines high maintenance cost is incurred as a result of the regularly necessary exchange of the lubricant.

SUMMARY

One potential object is to achieve a piston engine having a low-wear function without the use of lubricants. A further object of the piston engine is a simple construction with a reduction of movable, wear-intensive parts compared with conventional piston engines. An increase of the service life of the engine with lower production costs as a result of a reduction in the number of parts is a further object of the piston engine.

The piston engine proposed by the inventor has at least one first piston and at least one first housing, wherein the at least one first housing completely, or at least partially, encloses the at least one first piston. The at least one first piston is magnetically supported in a movable manner in the at least one first housing by at least one device for the magnetic supporting of the at least one first piston. The at least one device for the magnetic supporting of the at least one first piston is arranged in a stationary manner relative to the at least one first housing.

As a result of the magnetic supporting of the at least one first piston in the at least one first housing, friction between the piston and the housing is prevented and use of lubricants can be dispensed with. A stationary arrangement of the at least one device for magnetic supporting leads to a simple construction with a minimum number of movable parts. Such a piston engine is simple and inexpensive to produce.

The at least one device for the magnetic supporting of the at least one first piston can have at least one electromagnetic coil which is arranged in a stationary manner relative to the at least one first housing. An electromagnetic coil can be simply controlled by a current and the magnetic field which is required for the magnetic supporting of the piston can be simply adjusted in its magnitude. Alternatively, magnetic supporting can also be effected via permanent magnets.

The at least one device for the magnetic supporting of the at least one first piston can have two positions for supporting with three support points in each case. As a result of this construction, 4 degrees of freedom of the piston can be adjusted and a particularly stable supporting can be achieved. The 4 degrees of freedom are provided by the displacement of the piston in the two axes which lie perpendicularly to the movement axis of the piston, and tilting around these two axes is provided.

Alternatively, or in addition, the at least one first piston can have at least one magnetic coil. Via the coil, or the coils, of the piston, this enables a creation and controlling of the magnetic field which serves for supporting the piston.

The at least one first piston can have at least one magnetic yoke, particularly a laminated yoke and/or a yoke formed of soft magnetic composite materials. In the yoke, a current is induced by the magnetic field during movement of the piston, the current also creating a magnetic field. Interacting with the magnetic field of the at least one device for supporting the at least one first piston, the piston is supported in a levitating manner in the at least one first housing. A coil on, or in, the at least one first piston can be dispensed with, or this can be used in addition for fine control of the support.

The at least one first piston can be mechanically connected to at least one spring, particularly to a spring system. The spring, or the spring system, can assist the magnetic, frictionless supporting of the at least one first piston. The spring, or the spring system, can also be used for power transmission from the piston to other parts.

The at least one first piston can be a cylindrical circular piston with a circular or elliptical base surface and the at least one first housing can be a cylindrical housing with a circular or elliptical base surface. This leads to a particularly simple construction. An elliptical forming of the piston and of the housing can enable stable supporting even via two support positions with only two support points in each case, or in the case of three support points can lead to an increase of supporting stability.

The at least one first piston can have at least one extension which has the form of a hollow cylinder. The at least one first housing can have a recess for the at least one extension. Via the extension and the corresponding recess in the housing, a further stabilization of the piston can be achieved and canting of the piston during operation of the engine can be prevented.

The piston engine can have an electromagnetic linear machine. As a result of the combination of the magnetic supporting of the piston and the electromagnetic linear machine, an energy conversion can be carried out directly in the linear machine. A saving can thus be made on costly mechanical constructions which would possibly have to be lubricated. The electromagnetic linear machine and the at least one device for the magnetic supporting of the at least one first piston can be two devices which are separated from each other. They can also have common parts, however. In the second case, parts which serve for magnetic supporting can be used during energy conversion by the linear machine. This leads to a reduction in the number of parts compared with a construction with a support and a linear machine which are built separately from each other.

The electromagnetic linear machine can have ring coils which are arranged along a movement direction of the at least one first piston. This leads to a particularly simple construction and to an energy conversion by the linear machine with a high degree of efficiency.

The electromagnetic linear machine can be constructed as a reluctance machine, as a PM synchronous machine or as an asynchronous machine.

Furthermore, the electromagnetic linear machine can be of an n-phase construction with a positive integer n, and/or the winding of the electromagnetic linear machine can be arranged along a straight line, consecutively repeated m-times with a positive integer m.

At least one first chamber can be formed between the at least one first piston and the at least one first housing, the chamber having at least one inflow passage and at least one outflow passage and/or having at least one valve. As a result, a compressor or an internal combustion engine is formed by the piston engine.

In a method when using the previously described piston engine, the adjustment of the size of a gap which exists between the at least one first piston and the at least one first housing can be carried out by deformation of the at least one first piston and/or by deformation of the at least one first housing. In particular, the deformation, or the deformations, can be brought about as a result of the effect of a magnetic field. The magnetic field in turn can be created by devices which are used at the same time for supporting and/or for the linear machine.

In the method, a slotting of the at least one first housing can bring about a reduction of the effort which is expended for the adjustment of the size of the gap.

A seal can be introduced into the gap and the magnetic supporting of the at least one first piston can bring about an accurately defined pressure force upon the seal. The seal can be formed of PCTFE or Teflon.

The at least one first housing can also be cooled and/or heated. Cooling and heating can be advantageous especially in the case of a construction of the piston engine as a Stirling motor.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
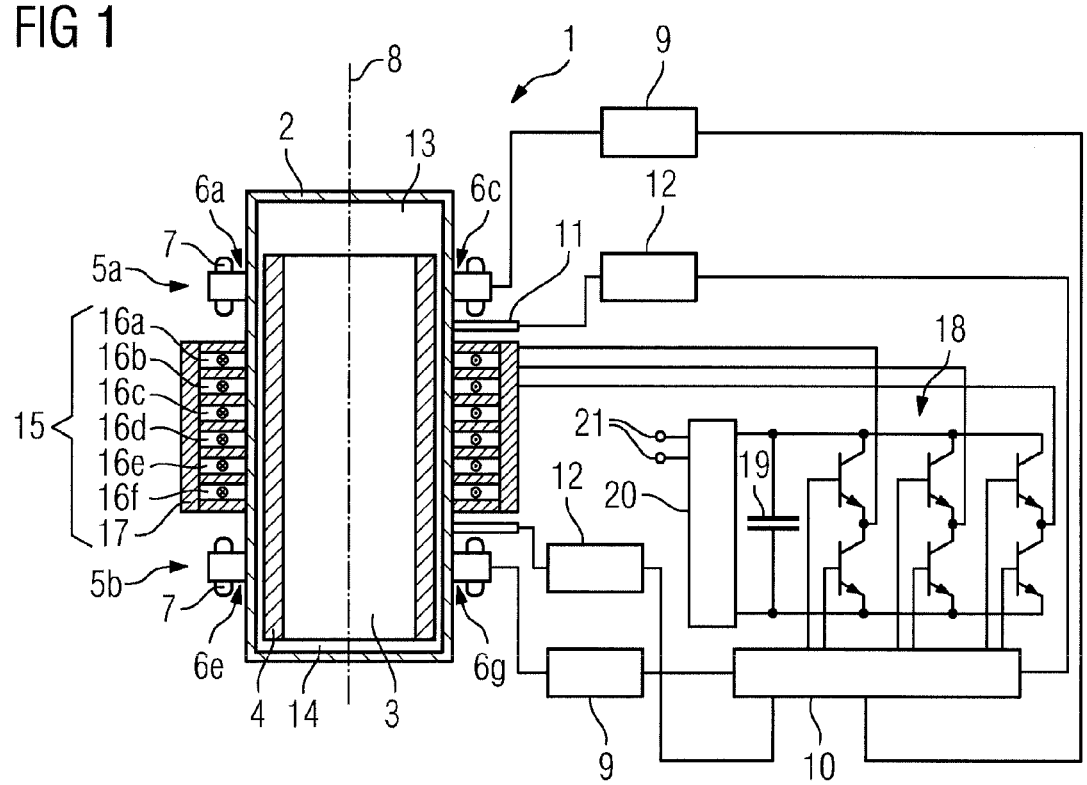
FIG. 1 shows a longitudinal section of a piston engine with magnetic supporting and also with an electromagnetic linear machine.

Reference will now be made in detail to the preferred embodiments of the present invention, examples of which are illustrated in the accompanying drawings, wherein like reference numerals refer to like elements throughout.

FIG. 1 shows a section through a piston engine 1 according to one potential embodiment. The piston engine 1 has a cylindrical housing 2 in which a cylindrical piston 3 is movably arranged. A magnetic yoke 4 is arranged on the outer circumferential surface of the cylindrical piston 3. Arranged outside the housing 2, on its cylindrical outer circumference, at two positions 5a and 5b along the outer circumference at four support points 6a to 6d, or 6e to 6g, in each case, are two magnetic circuits 7a to 7p in each case for magnetic supporting of the piston 3. An alternative embodiment, which is not shown in the figures, has three support points 6a to 6c with a magnetic circuit 7a to 7f in each case, which can be adequate for stable supporting of the piston. Combinations of the aforesaid number or, depending upon the application and dynamic effects, changes in the number of magnetic circuits, support points and positions are possible according to the desired application. In the sectional view in FIG. 1, for the sake of simplicity, only two support points 6a and 6c, or 6e and 6g, are shown per position 5a and 5b. The positions of the magnetic support 5a and 5b are arranged along a center axis 8 of the housing 2 at the same distance in each case from a bottom surface and top surface of the cylindrical housing 2. Along a circular plane of section through the housing 2, perpendicularly to the center axis 8, at a position 5a or 5b of the magnetic support in each case, the support points 6a to 6c, or 6e to 6g, are arranged along the outer circumference of the circular plane of section at equal distances from each other.

The magnetic circuits 7a to 7p at the support points 6a to 6g can be constructed from permanent magnets or from electromagnetic coils. In the case of electromagnetic coils, these can have a yoke in each case. The magnetic circuits 7a to 7p create magnetic fields which by magnetic field lines, which are oriented perpendicularly to the center axis 8, project into the housing 2. The interaction between these magnetic fields and the magnetic field which is created by the magnetic yoke 4 of the piston 3 leads to a contactless magnetic supporting of the piston 3 in the housing 2. In this case, the piston 3 is freely movable along the center axis 8 inside the housing 2. The interaction of the magnetic fields of the yoke 4 and of the magnetic circuits 7a to 7p keep the piston 3 in a levitating state in the housing 2 without the piston 3 contacting the housing 2.

As shown in FIG. 1, the magnitude of the magnetic field of the magnetic circuits 7a to 7p from the coils is electrically determined in each case via a current flow inside the coils. Control electronics of the magnetic circuits 9 open-loop controls or closed-loop controls the magnitude of the currents in the coils and therefore the magnitude of the magnetic fields of the magnetic circuits 7a to 7p. In the case of closed-loop controlling, distance sensors 11, which are arranged on the housing 2, can deliver information about the position of the piston 3 in the housing 2 and via electronics of the distance sensors 12 and a central controller of the control electronics 10 can transmit signals to the control electronics of the magnetic circuits 7a to 7p. Via the signals, the magnetic fields are closed-loop controlled and in the case of deviation of the center axis of the piston from the center axis of the housing 8 a distance sensor 11 can transmit a signal to the electronics 12, 10, 9, which leads to an adjustment of the current in the magnetic circuits 7a to 7p, as a result of which the magnetic field is altered and, interacting with the magnetic field of the yoke 4 of the piston 3, an additional force is exerted upon the piston, which alters its position. The position is altered so that its center axis coincides with the center axis of the housing 8.

As also shown in FIG. 1, coils 16a to 16e, and also a yoke 17 which encompasses the coils 16a to 16e, are arranged on the outer circumference of the housing 2. The coils 16a to 16e in conjunction with the yoke 17, also in conjunction with the yoke 4 of the piston 3, form a linear machine 15. Therefore, the yoke 4 of the piston 3 serves both for magnetic supporting of the piston 3 and as part of the linear machine 15. By the linear machine 15, mechanical energy of the piston 3 can be converted directly into electrical energy and/or vice versa. A saving is made on costly mechanisms which are subject to wear and would have to be lubricated. Via electronics 18 and an intermediate current circuit 19, and also electronics for the network connection 20, the linear machine 15 can be connected to a network via terminals 21. Therefore, a current which is created by the linear machine 15 can be fed to an external network.

Figure 2:
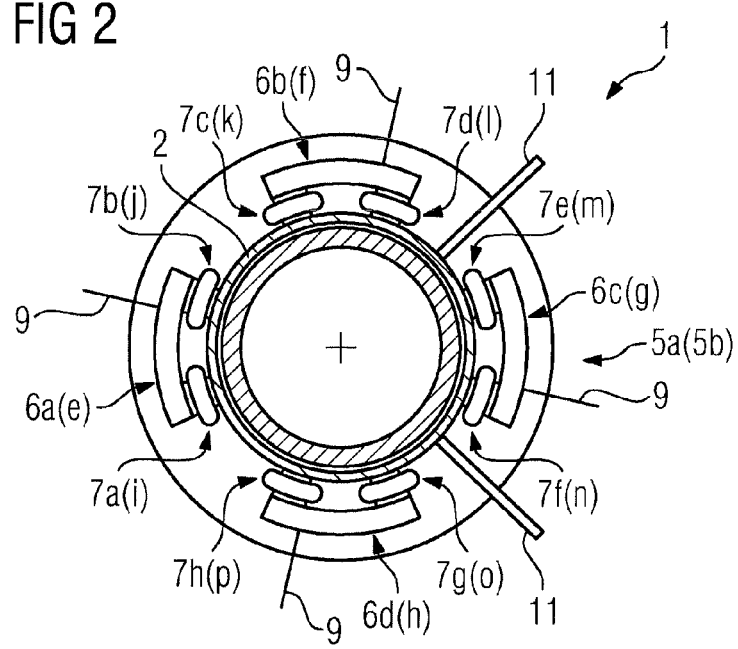
FIG. 2 shows a cross section perpendicularly to the longitudinal axis of the piston engine shown in FIG. 1.

FIG. 2 shows a cross section perpendicularly to the longitudinal axis of the piston engine 1 at a position 5a or 5b. Two distance sensors 11 are to be seen in sectional view and are attached on the housing 2 or integrated in the housing 2, and are arranged in a slightly spatially offset manner from the position 5a or 5b. As shown in FIG. 1, two additional distance sensors 11 are arranged at the second position 5b or 5a in a slightly spatially offset manner. Via the four distance sensors 11, the position of the piston 3 relative to the housing 2 can be clearly defined.

Between the piston 3 and the housing 2, a first and a second chamber 13 and 14 are formed in each case along the longitudinal axis 8 at the top and bottom of the housing 2 and the piston 3. During movement of the piston 3 along the longitudinal axis 8, the volume of the chambers 13 and 14 is altered. The volume of the chamber 13 decreases so the volume of the chamber 14 increases, and vice versa. The chambers 13 and 14 can serve as combustion chambers in an internal combustion engine, or, in a Stirling engine, one chamber can be heated and one chamber can be cooled in turn, and vice versa. As a result, a force is exerted upon the piston 3, creating the movement along the axis 8. The energy of the movement of the piston 3 can be converted by the linear machine 15 directly into electrical energy.

On the housing 2, or integrated in the housing 2, four support points 6a to 6d, or 6e to 6h, are shown in each case in FIG. 2 at the position 5a or 5b. Two magnetic circuits 7, which have in each case a yoke, or have a common yoke, are arranged in each case at each support point 6a to 6h, wherein for the sake of simplicity only the common yoke is shown in FIG. 2.

Figure 3:
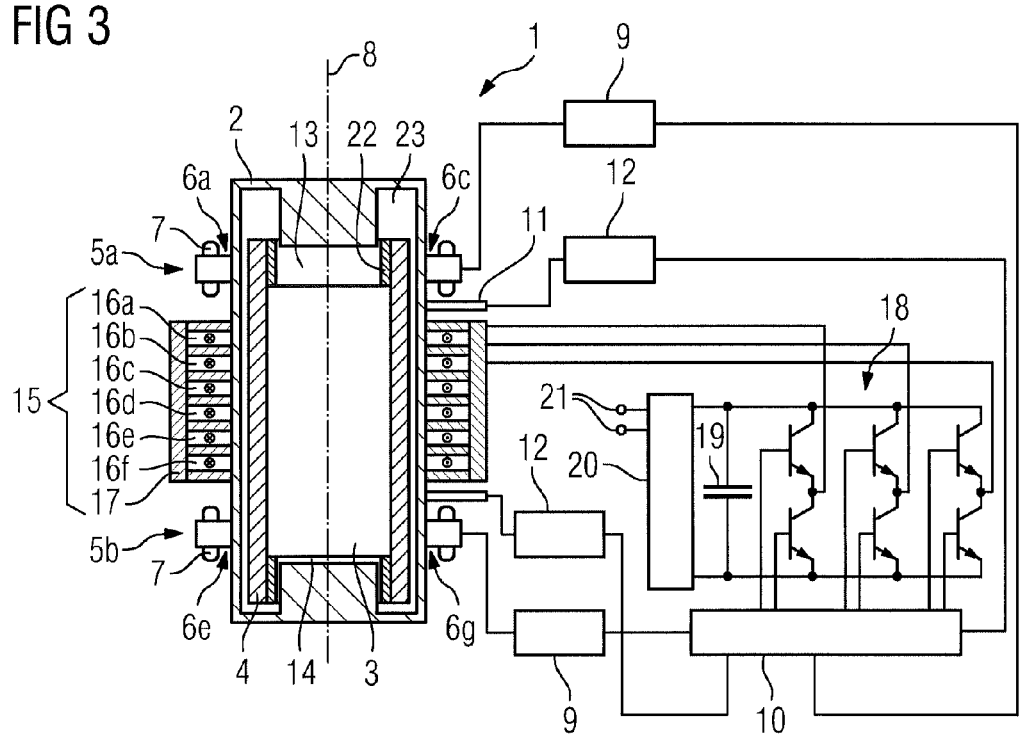
FIG. 3 shows a longitudinal section of the piston engine from FIG. 1 with a hollow-cylindrical extension of the piston and with a corresponding recess in the housing.

Shown in FIG. 3 is an alternative embodiment of the piston engine 1. This embodiment, in comparison to the embodiment in FIGS. 1 and 2, leads to a higher positional stability of the piston 3 relative to the housing 2, or prevents canting of the piston 3 in the housing 2. A hollow cylinder is arranged in each case in the housing 2 at the top of the piston and at the bottom of the piston, as shown in FIG. 3. The piston 3 is therefore extended in each case at its ends by a hollow cylindrical extension 22. Corresponding recesses 23 with a shape inverse to the hollow cylindrical extensions 22 are formed in each case at the top of the housing and at the bottom of the housing.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide V. DIRECTV*, 69 USPQ2d 1865 (Fed. Cir. 2004).

The invention claimed is:

1. A free piston engine that is a combustion engine or Stirling engine, comprising: a first piston; a first housing at least partially enclosing the first piston; an electromagnetic linear machine configured to generate electrical energy from movement of the piston; and a support device to magnetically support the first piston in a movable manner in the first housing by producing a magnetic field that interacts with the first piston, the support device comprising a support electromagnetic coil located outside of the first housing and orientated such that a central axis of the coil, around which the coil is wound, is substantially perpendicular to a longitudinal central axis of the first housing, and the support device being arranged in a stationary manner relative to the first housing and being a device different from the electromagnetic linear machine.

2. The piston engine as claimed in claim 1, wherein the support device has an electromagnetic coil arranged in a stationary manner relative to the first housing.

3. The piston engine as claimed in claim 1, wherein the support device has at least two axial support positions, and
at each support position, the support device has at least three support points to support the first piston.

4. The piston engine as claimed in claim 1, wherein the first piston has a magnetic coil.

5. The piston engine as claimed in claim 1, wherein the first piston has a magnetic yoke, and
the magnetic yoke is a laminated yoke, and/or a yoke formed of soft magnetic composite materials.

6. The piston engine as claimed in claim 1, wherein the first piston is mechanically connected to a spring system.

7. The piston engine as claimed in claim 1, wherein the first piston is a cylindrical circular piston with a circular or elliptical base surface, and the first housing is a cylindrical housing with a circular or elliptical base surface.

8. The piston engine as claimed in claim 1, wherein the first piston has a hollow cylinder extension projecting axially from the first piston, and the first housing has a ring-shaped recess shaped to receive the hollow cylinder extension.

9. The piston engine as claimed in claim 1, wherein the electromagnetic linear machine has ring coils which are arranged along a movement direction of the first piston.

10. The piston engine as claimed in claim 1, wherein the electromagnetic linear machine is constructed as a reluctance machine, a permanent magnet synchronous machine, or an asynchronous machine.

11. The piston engine as claimed in claim 1, wherein the electromagnetic linear machine has an n-phase construction with n being a positive integer, and/or the electromagnetic linear machine has a winding arranged along a straight line, consecutively repeated m-times with m being a positive integer.

12. The piston engine as claimed in one of claim 1, wherein the electromagnetic linear machine and the support device are separated from each other.

13. The piston engine as claimed in claim 1, wherein a chamber is formed between the first piston and the first housing, and the chamber has at an inflow passage, an outflow passage and/or a valve.

14. A method of using a piston engine, the piston engine being a free piston engine that is a combustion engine or Stirling engine comprising: a first piston; a first housing at least partially enclosing the first piston with a gap between the first piston and the first housing; an electromagnetic linear machine configured to generate electrical energy from movement of the piston; and a support device to magnetically support the first piston in a movable manner in the first housing by producing a magnetic field that interacts with the first piston, the support device comprising a support electromagnetic coil located outside of the first housing and oriented such that a central axis of the coil, around which the coil is wound, is substantially perpendicular to a longitudinal central axis of the first housing, and the support device being arranged in a stationary manner relative to the first housing and being a device different from the electromagnetic linear machine, the method comprising: adjusting a size of the gap between the first piston and the first housing by deforming at least one of the first piston and the first housing using a magnetic field.

15. The method as claimed in claim 14, wherein a slotting of the first housing reduces an effort required to adjust the size of the gap.

16. The method as claimed in claim 14, wherein a seal formed of PCTFE or Teflon, is introduced into the gap, and the support device defines a pressure force upon the seal, using the magnetic field.

17. The method as claimed in claim 14, further comprising cooling or heating the first housing.

18. The piston engine as claimed in claim 1, further comprising a first combustion chamber formed by a space between the first housing and a first longitudinal end of the first piston, and a second combustion chamber formed by a space between the first housing and a second longitudinal end of the first piston opposite to the first longitudinal end.

19. The piston engine as claimed in claim 1, wherein the support device comprises a plurality of support electromagnetic coils positioned at different respective support points along a circumferential direction around the first housing.

* * * * *

UNITED STATES PATENT AND TRADEMARK OFFICE
CERTIFICATE OF CORRECTION

PATENT NO. : 8,978,595 B2  Page 1 of 1
APPLICATION NO. : 13/394254
DATED : March 17, 2015
INVENTOR(S) : Markus Klöepzig It is certified that error appears in the above-identified patent and that said Letters Patent is hereby corrected as shown below:

In the Claims:

Column 7, Line 4, in claim 12, after "claimed in" delete "one of".

Signed and Sealed this
Fourth Day of August, 2015

Michelle K. Lee
*Director of the United States Patent and Trademark Office*